July 16, 1968   T. J. KEATING   3,393,360
DEVICE FOR TESTING THE CRITICAL OPEN TIME OF
CONTACTS IN AN ELECTRONIC CIRCUIT
Filed June 9, 1964   2 Sheets-Sheet 1

Thomas J. Keating,
INVENTOR.

BY Harry M. Saragovitz
Edward J. Kelly
Herbert Berl
Robert C. Sims

July 16, 1968

T. J. KEATING 3,393,360

DEVICE FOR TESTING THE CRITICAL OPEN TIME OF
CONTACTS IN AN ELECTRONIC CIRCUIT

Filed June 9, 1964

Thomas J. Keating,
INVENTOR.

BY Harry M. Saragovitz
Edward J. Kelly
Herbert Berl
Robert C. Sims

United States Patent Office 3,393,360
Patented July 16, 1968

3,393,360
DEVICE FOR TESTING THE CRITICAL OPEN TIME OF CONTACTS IN AN ELECTRONIC CIRCUIT
Thomas J. Keating, Orlando, Fla., assignor, by mesne assignments, to the United States of America as represented by the Secretary of the Army
Filed June 9, 1964, Ser. No. 373,889
5 Claims. (Cl. 324—28)

ABSTRACT OF THE DISCLOSURE

A discontinuity timing test device that turns on an indicator, such as a light, horn or the like, when a contact in an electronic circuit is opened for a time greater than a pre-selected time period. The device has a transistor in shunt with various timing constants. The transistor conducts as long as the contacts under test are closed, and shunts current flow through the timing circuit when the contact is open. If the contact is open longer than the timing constant, the indicator will be actuated.

---

Figure 1:
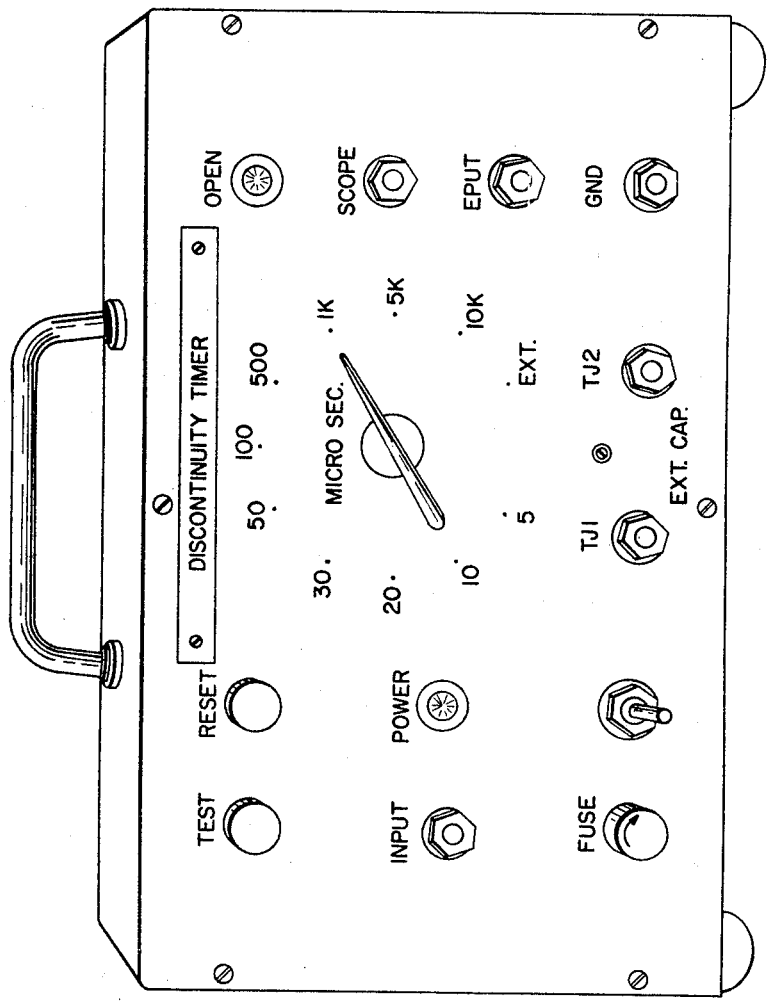

This invention relates to a test unit which will automatically and positively provide a permanent indication when a discontinuity of a device to be tested is greater than a pre-selected time period has occurred.

At the time of Pershing A/B "Black Box" design evaluation it was observed that laboratory test equipment was not adequate to test connector and relay contact performance during dynamic testing. A need existed for an item of test equipment which would automatically and positively indicate a contact failure. This equipment must be able to test contact performance during dynamic testing on such devices as relays, switches, and connectors. An indication of a contact opening must be given when it is greater than a pre-selected time period, and no indication must be given for contact openings which are not considered a device failure. The use of transient indicators will not give this information. The testing prior to this invention required the need for constant oscilloscope monitoring and a spurious opening could be missed as such as difficult to observe on an oscilloscope. The test set-up in the past was laborious and time consuming.

It is, therefore, an object of the present invention to provide a test unit which will automatically and positively indicate a contact failure.

Another object of this invention is to give an indication of a contact opening when it is greater than a pre-selected time period.

A further object of the present invention is to provide a test unit which will not give an indication for a contact opening which is not considered a device failure.

Figure 2:
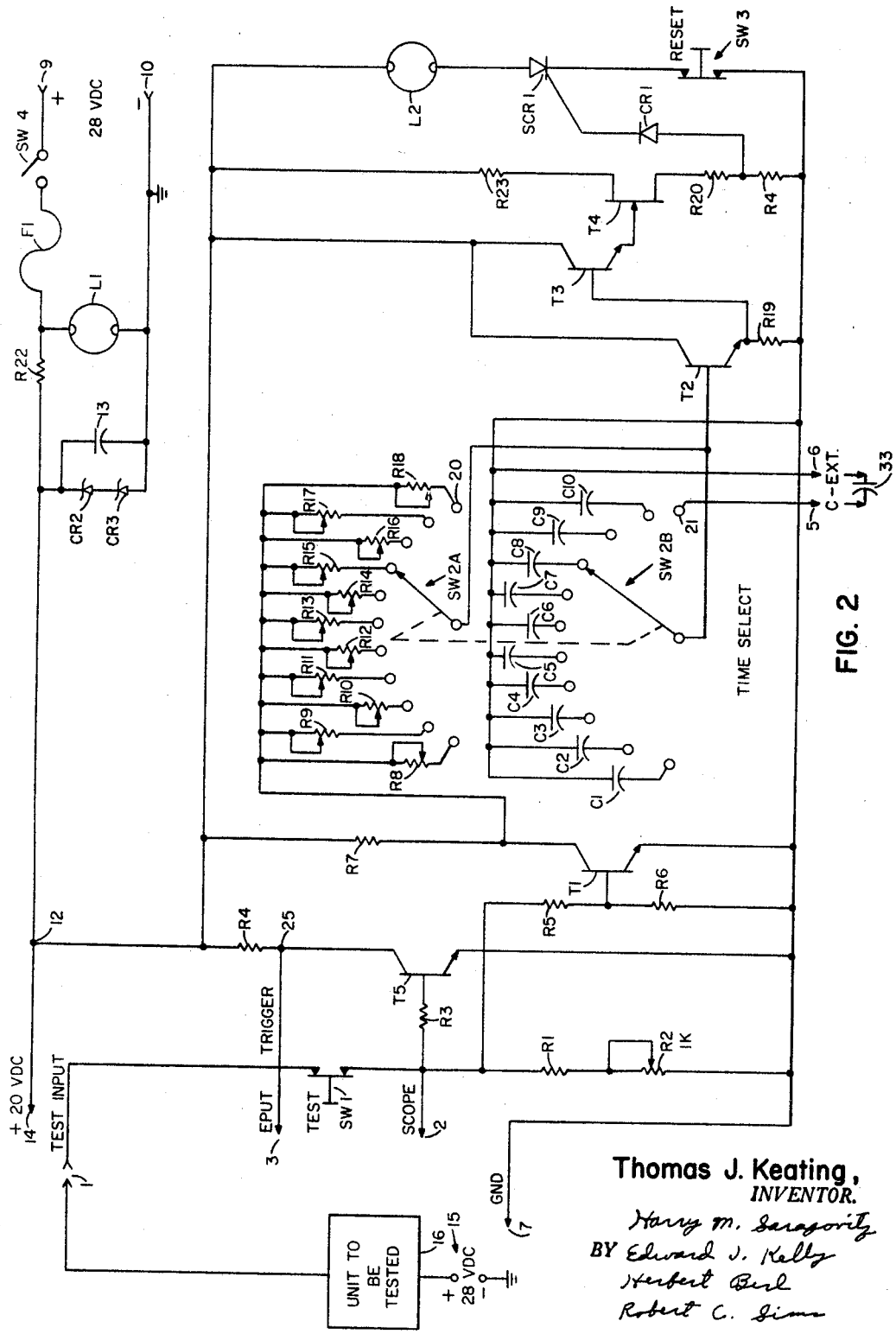

The various features of novelty which characterize this invention are pointed out with particularity in the claims annexed to and forming a part of this specification. A better understanding of the advantages, specific objects obtained with use of, and many of the attendant advantages of this invention will be readily appreciated as the same becomes better understood by reference to the following detailed description when considered in connection with the accompanying drawing in which like reference numerals designate like parts throughout the figures thereof and wherein:

FIGURE 1 is a perspective front view of the contact interruption timer test unit and FIGURE 2 shows a schematic diagram illustrating a preferred form of the invention.

In order to better understand the operation of the system described in the figures, a description of their components referred to is first presented. FIGURE 1 shows the front of the test unit. The light marked OPEN gives the main indication of the test unit. The back of the unit, not shown, has provisions for connecting a power input, a ground, and a 20 volt output connection. There is further provided an adjustment slot for the 1K potentiometer R2, shown in FIGURE 2, in the back of the unit. The elements shown in FIGURE 1 correspond to those in FIGURE 2 in the following manner:

Test button of FIGURE 1 corresponds to SW1 of FIGURE 2;
Reset button of FIGURE 1 corresponds to SW3 of FIGURE 2;
Open light of FIGURE 1 is the same as light L2 of FIGURE 2;
The indicator shown in FIGURE 1 is directly linked to switches 2A and 2B of FIGURE 2;
Input jack of FIGURE 1 is connected to terminal 1 of FIGURE 2;
Power light which is shown in FIGURE 1 is the same as light L1 of FIGURE 2;
The SCOPE jack of FIGURE 1 is connected to terminal 2 of FIGURE 2;
The EPUT jack shown in FIGURE 1 is connected to the terminal 3 of FIGURE 2;
The fuse plug shown in FIGURE 1 corresponds to fuse F-1 of FIGURE 2;
The switch shown next to the fuse plug in FIGURE 1 corresponds to switch SW-4 of FIGURE 2;
TJ1 and TJ2 jacks of FIGURE 1 are connected to terminals 5 and 6 of FIGURE 2; and
GND jack shown in FIGURE 1 is connected to ground terminal 7 of FIGURE 2.

In FIGURE 2 a 28 v. DC is connected across terminals 9 and 10. When SW-4 is closed, light L-1 is lit and power is provided to junction 12 by way of fuse F-1 and resistor R22. Two 10 watt Zener diodes CR2 and CR3 have a capacitor filter 113 across them and are connected in series with a resistor R22 to provide a simple, economical means of obtaining a regulated 20 v. DC supply for test unit power. This regulated voltage supply also supplies a terminal 14 which is connected to a jack, not shown, in the back of the test unit.

A bank of resistors R8 through R18 and a bank of capacitors C1 through C10 are provided to be swept by contact arms SW2A and SW2B respectively. By so doing a variable time delay from 5 to 10K microseconds can be gotten. Terminals 5 and 6 are connected to SW2B and ground network in order to allow an external capacitor to be connected in this time selection network so as to allow this network to have any desired time delay. Contact arms SW2A and SW2B are ganged together.

OPERATION

The test input circuit consists of a loading circuit (R1 and R2) and a saturated transistor switching circuit (transistor T1 and associated resistors R5 and R6). The loading circuit has a 1K potentiometer R2 to permit loading contacts with current in the order of 50 ma. The resistor R1 is a 20 ohm resistor to protect against inadvertent overloading during potentiometer adjustment. A voltage source 15 at 28 v. DC is normally supplied to the contacts 16 to be tested. However, the unit will operate satisfactorily from 10 v. DC to 100 v. DC. With contacts 16 closed and switch SW1 closed, transistor T1 will have a base current which is more than enough to saturate transistor T1. This has the effect to clamp all of the time selection circuits R8 through R18, C1 through C10, and C-EXT. to ground, or about .35 volt, while voltage 15 is passed by the contacts 16.

When a contact interruption occurs, the test voltage at 1 is removed from the test input and transistor T1 becomes cut off. This allows the selected charging circuit to begin charging; e.g., R7, R15, and C8 will start to charge from .35 volt, or ground, towards the 20 volt supply present at junction 12. After 1K microseconds (see FIGURE 1 to find the amount of microseconds delay for each charging circuit) capacitor C8 reaches 13 v. This is the amount of volts required to fire transistor T4 via the high impedance driver circuit consisting of transistors T2 and T3. However, if contact interruption does not last for 1K microseconds, then the test voltage will reappear and transistor T1 once again will become saturated and the charging circuit will again be clamped to ground before the firing voltage level is reached. The capacitor C8 will discharge through resistor R15 and transistor T1.

When T4 is fired, current is allowed to flow from junction 12 through resistor R23, transistor T4, resistor R20 and diode CR1 to the gate electrode of silicon controlled rectifier SCR1. This current is sufficient to gate on SCR1. When SCR1 is gated on it presents a low resistance path to ground through its main current path for open lamp L2 which will turn that lamp on. SCR1 will remain on even though T4 returns to a no fire potential. Thus lamp L2 will remain on until reset. To turn off, or reset, open lamp L2, the SCR1 must be turned off. This is done by depressing reset switch SW3 which will interrupt the current flow through the SCR1. Lamp 12 could be replaced by a buzzer or the like to give an audible signal rather than visual or a control circuit could be provided for other equipment.

If detailed studies are desired, an additional hook-up of a scope and an EPUT meter may be made at terminals 2 and 3 respectively. The scope is connected to the test input by way of the test switch SW1. A circuit consisting of resistor R4, junction 25, and transistor T5 is provided to supply a large amplitude, positive, fast rise time trigger signal for + slope triggering of the EPUT meter. Transistor T5 will be cut on and off as the test input is cut on and off because of its base electrode connection through resistor R3.

If a time delay other than that provided for by C1 through C10 is desired another capacitor 33 or capacitor bank may be connected across terminals 5 and 6. The sweep arms SW2A and SW2B will be placed on terminals 20 and 21 so as to place this external capacitor 33 in the charging circuit of the time selector in the same manner as the other capacitors C1 through C10.

While in accordance with the provisions of the statutes, I have illustrated and described the best forms to the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features. Accordingly, I desire the scope of my invention to be limited only by the appended claims.

I claim:

1. A contact interruption timer test unit comprising a first source of DC voltage having first and second output terminals; an impedance means having first and second ends; said first end being connected to said first output terminals; a three terminal controlled element having two output terminals connected between said second end of said impedance means and said second output terminal; said controlled element having an input terminal connected to a test voltage through a device to be tested; a time selector means having first and second sections with a common interconnecting junction point between them, said first section of the time selector means containing resistance means and said second section containing capacitance means, said time selector means being connected in parallel with said controlled elements; a first circuit means consisting of a plurality of cascaded transistors that are powered by said first source of DC voltage through said first and second terminals and said cascaded transistors having an input thereto which is connected to said common junction point of said time selector means and an output which is connected to a gate electrode of a silicon controlled rectifier; an indicator means; and said indicator means being connected between said first and second output terminals by way of the anode cathode current circuit of said silicon controlled rectifier.

2. A test unit as set forth in claim 1 wherein said first section is connected between said second end of the impedance means and said common junction point; and said second section is connected between said common junction point and said second output terminal.

3. A test unit as set forth in claim 1, wherein said first section comprises a plurality of resistors having one end connected to said second end of said impedance, and each having another end which is connected to a first set of individual terminal means; a first sweep arm adapted to selectively engage said individual terminal means; said sweep arm being connected to a common junction point; said second section comprising a plurality of capacitors having one end connected to said second output terminal, and each having another end which is connected to a second set of individual terminal means; a second sweep arm adapted to selectively engage said second set of terminal means; said second sweep arm being connected to said common junction point and said first and second sweep arms being mechanically connected together for simultaneous movement to selectively enage said individual terminal means of said first and second sections simultaneously.

4. A test unit as set forth in claim 3, wherein said three terminal controlled element is a first transistor; a switch, said switch connected between a base electrode of said first transistor and said test voltage.

5. A test unit as set forth in claim 4, further comprising a second impedance means having one side connected to said first output terminal and another side connected to an output supply terminal; a second transistor having its emitter collector electrode path connected between the output supply terminal and said second output terminal; and said second transistor having a base electrode connected to said test voltage.

References Cited
UNITED STATES PATENTS
3,127,595   3/1964   Coyne _____ 324—68 XR

OTHER REFERENCES
Electronics (Kopp), May 20, 1960, vol. 33, #21, pp. 94–95.

General Electric SCR Manual (2nd edition), December 1961, p. 50.

Industrial Control Circuits (Sidney Platt), Rider Publications, #202, copyright 1958, pp. 118–119.

RUDOLPH V. ROLINEC, *Primary Examiner.*

E. L. STOLARUN, *Assistant Examiner.*